Nov. 18, 1952    J. R. DAVIDSON    2,618,457
NEEDLE VALVE
Filed May 19, 1950

INVENTOR.
JAMES R. DAVIDSON
BY D. Clyde Jones
ATTORNEY

UNITED STATES PATENT OFFICE

2,618,457
NEEDLE VALVE

James R. Davidson, Rochester, N. Y., assignor to Taylor Instrument Companies, Rochester, N. Y., a corporation of New York Application May 19, 1950, Serial No. 162,968

2 Claims. (Cl. 251—27)

This invention relates to needle valves and is an improvement over the valve disclosed in Tate et al. Patent 2,230,093, granted January 28, 1941.

The present invention has for its purpose the production of a needle valve which affords extreme accuracy and uniformity of operation in controlling the flow of a fluid therethrough.

The various features and advantages of the invention will appear from the detailed description and claims when taken with the drawing in which:

Figure 3:
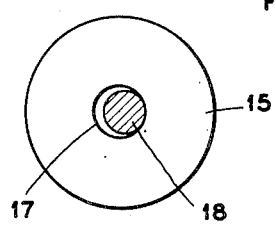
Fig. 3 is a view of the valve seat disc together with a cross section of its cooperating needle, particularly showing the crescent-shaped opening between these parts.

The needle valve of the present invention comprises a mounting block 5 provided with a cylindrical recess and having a lateral port 6 as well as a bottom port 7 both communicating with the recess. These ports may be used either as inlet ports or outlet ports depending on the connection of the needle valve in a pneumatic circuit. Within the mounting block there is secured, the hollow cylindrical valve body 9 which is closed at its top but which is open at its bottom. This valve body is provided with peripheral grooves 10 to receive gaskets or O-rings 11 which provide a pneumatic seal between the outer surface of the valve body and the inner surface of the recess in the mounting block. The top of the valve body is provided with a circular cover or head 13. While the valve body and its cover are herein illustrated as being made integral, it will be understood that these parts may be made separable as by means of threaded connections. The bottom of the hollow valve body is sealed closed by a centrally apertured valve seat disc 15, the periphery of which disc is soldered or otherwise joined to the lower part of the valve body at 16. The central orifice 17 in this disc is conical with its smaller diameter directed toward the top of the valve body, the conical wall of the opening providing a valve seat. The movable element or needle 18 of the valve, is conical in shape having its conical surface accurately conforming to the shape of the valve seat. The needle 18 is provided with a resilient stem 19 carrying at its upper end an enlarged portion 20 which is screwed into the tapped cavity in the closed top end of a hollow guiding plunger 21. It should be pointed out that the stem 19 of the needle 18 deviates from true axial alinement with the plunger so that the needle always engages one side of the valve seat (Fig. 3). Usually the inaccuracies in manufacturing, cause this condition to occur. In the event that it does not occur, the valve stem 19 can be bent slightly to obtain this result. The enlarged portion 20 of the stem 19, is screwed into the cavity until it seats against the bottom of the cavity as a positive stop.

Figure 1:
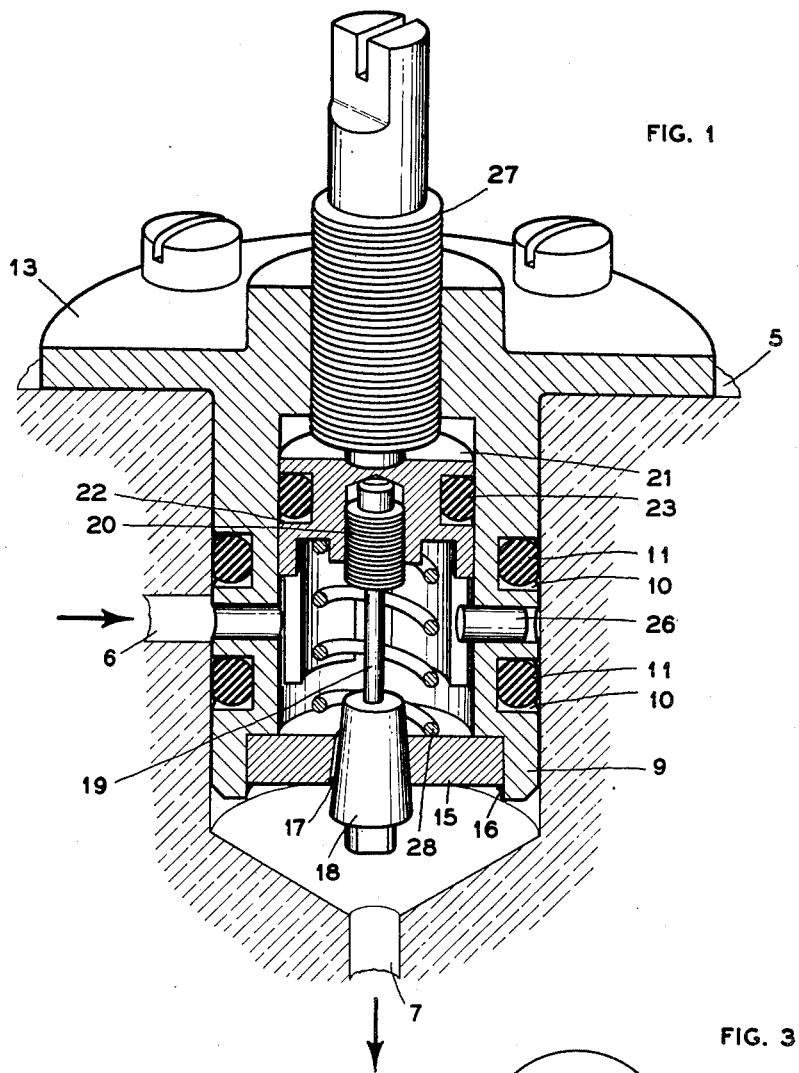
Fig. 1 is a vertical section taken through the present valve and its support.
Figure 2:
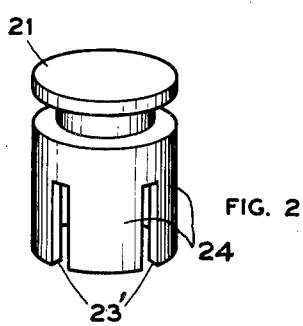
Fig. 2 is a perspective view of a plunger forming a part of the valve.

The plunger is mounted in the valve body for endwise movement only, to close the needle 18 or to open it to any desired intermediate position. The plunger, best illustrated in Fig. 2, is generally cylindrical in shape to mate closely with the inner cylindrical surface of the valve body. The upper portion of the plunger 21 is closed and is provided with a peripheral groove 22 to receive a gasket or O-ring 23 whereby the plunger can move within the valve body in pneumatically sealed relation therewith. The lower portion of the plunger is provided with four spaced slots 23′ extending from the lower edge of the plunger into the body thereof to define spring-like fingers 24. These fingers tend to flare outward somewhat like leaf springs so that this portion of the plunger closely engages the inner cylindrical wall of the valve body. The top of the plunger acts like a disc, the edge of which also closely engages the cylindrical wall of the valve body. This construction insures that the plunger will have a well-guided motion with respect to the valve body. One of the slots 23′ in the plunger receives a guide pin 26 mounted in the side wall of the valve body, thereby insuring that the plunger will be limited to endwise travel with substantially no rotary movement. One of the slots 23′, for example, the one opposite the slot which receives the guided pin, communicates with an opening in the lateral wall of the valve body, which opening in turn communicates with the lateral port 6 in the mounting block. The head 13 of the valve body has a threaded aperture in alinement with the principal axis of the plunger 21 as well as generally in alinement with the principal axis of the valve stem 19. This threaded aperture receives a threaded adjusting stem or screw 27 whereby the plunger 21 can be forced downward to open the needle valve by moving the conical portion thereof downward with respect to the conical valve seat and thereby open the needle valve. The coil spring 28 within the plunger, normally biases the plunger against the screw 27.

In operation, when the needle valve of the present invention is to be opened, the adjusting screw 27 is turned in a direction to force the plunger 21 and in turn the needle 18, to open the needle valve to any desired amount. When it is desired to reduce the flow of the fluid through the needle valve the adjusting screw 27 is turned in the reverse direction. The coil spring 28 within the plunger, causes the plunger to follow the upward movement of the adjusting screw until the needle valve is completely closed. In other words, the use of the coil spring 28 insures that the needle valve can be tightly closed without jamming or scoring the cooperating surfaces of the needle or of the valve seat. In the present arrangement, the valve needle is never rotated during adjustment and consequently there is no possibility of scoring the valve parts.

In the construction disclosed in said Tate et al. patent, one end of the rotatable adjusting stem was tapered to insure that the needle in its partially open condition, was always maintained in eccentric relation with respect to the orifice and in engagement with a side wall thereof, so that the opening through the orifice was always crescent-shaped.

However, the rotary adjustment of the stem tended to bring a constantly changing area of the needle into contact with a constantly changing area of the valve seat. While these parts were machined with great care they still lacked absolutely perfect roundness and straightness. This had two undesirable consequences. First, as the adjusting stem moved to push the needle from its closed position to its open position, the flow did not increase uniformly but would increase at varying rates and at times actually decrease. Second, if the needle were removed for cleaning it might be rotated and replaced in a different position so that for the same settings of the valve stem a different set of flow rates would result.

In the present invention not only the needle 18, but also the plunger 21 which guides it, are kept from rotating. Consequently, the same area of the needle is continuously made to bear against the same area of the tapered seat. By this means, the rate of flow is caused to change uniformly as the adjusting stem 27 is turned. Further, the screw threaded portion 20 for attaching the stem 19 and its needle 18 to the plunger, is provided with a positive stop so that the needle, if removed for cleaning, will be returned to the same angular relation with the valve disc.

It has been found that the needle valve of this invention, insures a uniform relation between the position of the valve stem and the flow through the valve, both with respect to the change of flow on a change of adjusting stem position and the ability to return to the same flow when the valve stem, following a change in adjustment, is restored to any given position.

What I claim is:

1. In a device of the class described, a hollow valve body closed at one end and having a lateral port, a valve disc sealing the other end of said body, said disc having a conical orifice therethrough directed toward said closed end, a plunger movable toward and away from said orifice in pneumatically sealed relation with the inner wall of said body, means for limiting said plunger to endwise movement only along the principal axis of said body, a conical valve needle mating with said orifice to control the flow of fluid therethrough, said needle being attached to said plunger and being laterally spring biased to project eccentrically into said orifice whereby a given area of the needle cooperates with a given area of the side wall of the orifice to insure a crescent-shaped passage therethrough, and means for moving the plunger and in turn the needle with respect to said disc.

2. In a device of the class described, a hollow valve body provided with a cylindrical recess closed at one end and having a lateral port, a valve disc sealing the other end of said body, said disc having a conical orifice therethrough directed toward said closed end, a cylindrical cup-shaped plunger movable in said recess toward and away from said orifice in pneumatically sealed relation with the inner wall of said body, the rim of said plunger being slotted to provide spring fingers snugly engaging the wall of said recess, means for limiting said plunger to endwise movement only in said recess, a conical valve needle in said orifice to control the flow of fluid therethrough, said needle being flexibly mounted on said plunger to project eccentrically into said orifice whereby a given area of the needle cooperates with a given area of the side wall of the orifice to insure a crescent-shaped passage therethrough, and means for moving the plunger and in turn the needle with respect to said disc.

JAMES R. DAVIDSON.

REFERENCES CITED

The following references are of record in the file of this patent:

UNITED STATES PATENTS

| Number | Name | Date |
|---|---|---|
| 1,268,316 | Bergens | June 4, 1918 |
| 1,289,104 | Britton | Dec. 31, 1918 |
| 2,230,093 | Tate | Jan. 28, 1941 |
| 2,452,956 | Robins | Nov. 2, 1948 |